June 28, 1960

R. F. PEZZILLO 2,942,555

COMBINATION PUMP AND MOTOR

Filed April 15, 1957

INVENTOR.
RINALDO F. PEZZILLO
BY
ATTORNEYS

United States Patent Office 2,942,555
Patented June 28, 1960

2,942,555

COMBINATION PUMP AND MOTOR

Rinaldo F. Pezzillo, 28 Steeplebush Road, Levittown, Pa.

Filed Apr. 15, 1957, Ser. No. 652,864

3 Claims. (Cl. 103—87)

This invention relates to a combination pump and motor and, more particularly, to a structure providing improved cooling of the motor and lubrication of the motor and pump impeller shaft bearings in a combination pump and motor.

Numerous types of combination pumps and motors have been heretofore suggested but these constructions all involve various objections including complexity, difficulty of assembly, inadequate sealing, lubrication and cooling, and other objectionable features.

It is the primary object of this invention to provide a combination pump and motor which is inexpensive to manufacture, involves a minimum number of parts and affords a substantial degree of flexibility permitting the structure to be readily adapted for different types of service.

More specifically, it is an object of the invention to provide a combination pump and motor having no externally extending shafts and thus not requiring packing or sealing against a shaft to prevent leakage of fluids out of any of the housings of the combination pump and motor assembly.

It is an object of the invention to provide a combination pump and motor assembly in which there is provided a thermal barrier separating the driving motor assembly from the fluids being pumped such as would be desirably employed if high temperature fluids are being pumped.

It is an object of the invention to provide improved cooling and lubrication of a combination pump and motor assembly and more specifically to provide a basic construction which may employ either the fluids being pumped by the combination pump and motor or fluid pumped by an external source to provide bearing lubrication and motor cooling with only a minimum modification of parts being required.

It is an object of the invention to provide a combination pump and motor in which the impeller and impeller housing may be independently disassembled from the motor stator and stator housing and vice versa.

It is an object of the invention to provide improved sealing of the motor stator windings and improved sealing of the motor rotor windings providing complete protection of these parts from the flow of cooling fluid while imposing into the magnetic circuit only a minimum additional gap and magnetic reluctance.

These and other objects of the invention relating particularly to the construction and operation thereof will become evident from the following description when read in conjunction with the accompanying drawings in which.

Figure 1:
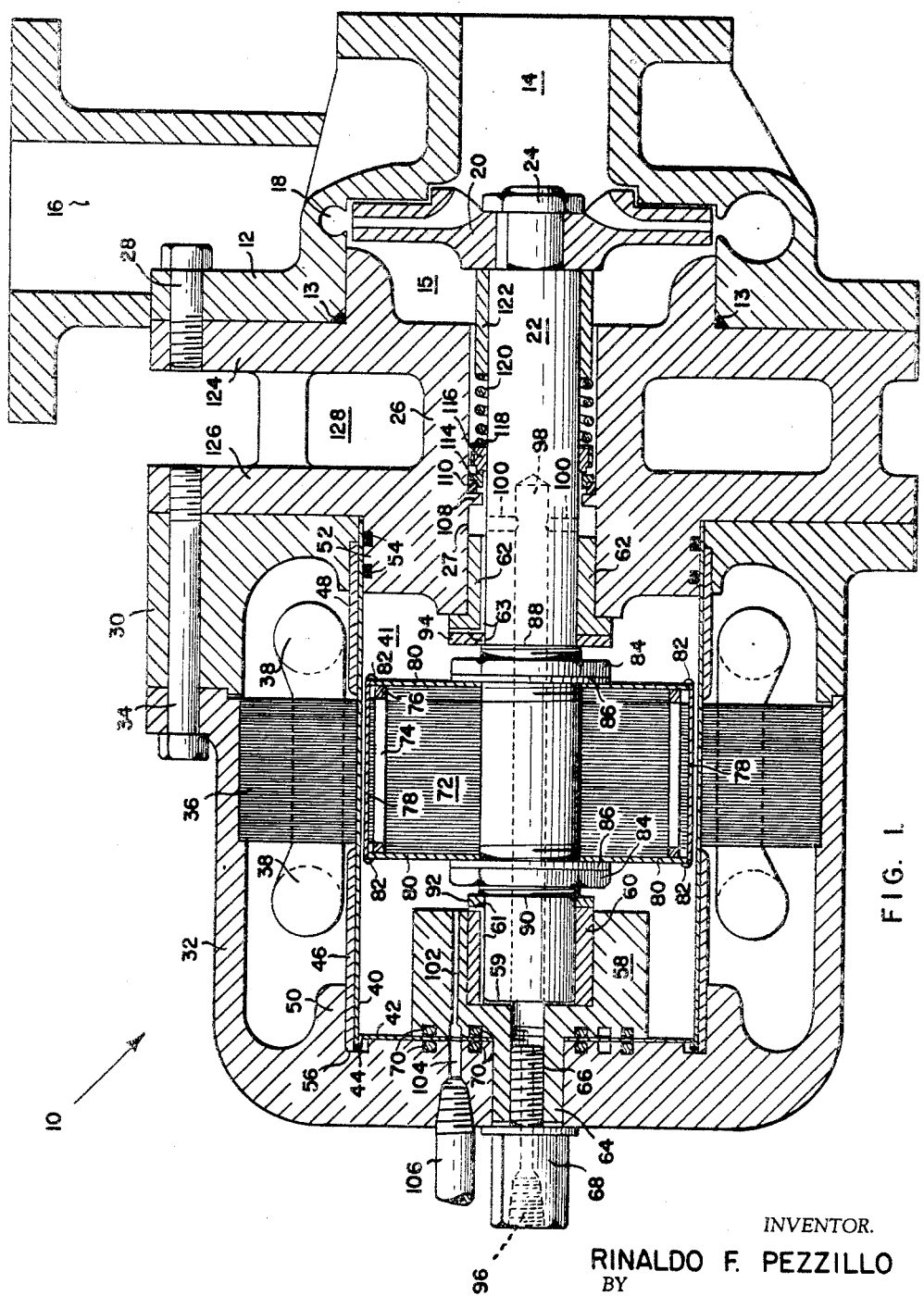
Figure 1 is an axial section through a combination pump and motor constructed in accordance with the invention.

In Figure 1 there is indicated generally at 10 a combination pump and motor constructed in accordance with the invention. The structure includes a pump impeller housing 12 having an axial inlet passage 14 and a tangentially extending outlet passage 16 which is connected to an annulus 18 surrounding a pump impeller 20. The pump impeller 20 is keyed to a shaft 22 and secured thereon by means of a suitable locking nut 24. The mounting of the shaft 22 will be hereinafter described.

The impeller housing 12 is bolted to a flange 124 extending from the right hand side of a thrust or bearing plate 26, as viewed in Figure 1, by means of an annular array of bolts 28, and a O ring 13 provides a seal between the housing 12 and the flange 124. The thrust plate 26 will be hereinafter described in greater detail. A motor housing is bolted to a flange 126 extending from the left hand side of the thrust or bearing plate 26 and includes an annular member 30 and a housing 32 which are bolted together and attached to the thrust plate by means of an annular array of bolts 34.

The motor housing 32 is in the form of a cup and retained within the housing are motor stator laminations 36 mounting motor stator windings 38. The construction of the laminations and windings are entirely conventional and need not be described in detail herein.

Positioned internally of the motor stator and provided to isolate the motor stator from cooling fluids surrounding the motor rotor as will hereinafter become evident is a stator liner cup formed from a cylindrical member 40 and a base member 42 having their mating flanges welded together as indicated at 44. The cup is formed preferably from light gauge non-magnetic material such as stainless steel or brass depending upon the materials being pumped. If stainless steel is employed, a .010" 18–8 type stainless steel is highly satisfactory. The wall 40 of the cup engages the inner face of the stator laminations 36 and is provided on its external surface adjacent to each side of the laminations 36 with reinforcing sleeves 46 and 48. The left hand sleeve 46, as viewed in Figure 1, has its left hand portion positioned under an inwardly extending annular flange 50 extending from the base of the motor housing cup 32. The right hand reinforcing sleeve 48 and the uppermost portion of the side wall 40 of the cup, i.e., the right hand end of the side wall as viewed in Figure 1, are positioned between the inner surface of the annular member 30 and the outer surface of a flanged portion 52 extending to the left from the thrust plate 26. It will be evident that the sleeves 46 and 48 serve to reinforce the light gauge cup material adjacent to each side of the stator laminations without extending the air gap of the magnetic circuit of the motor. It should be noted that the reinforcing sleeves 46 and 48 are preferably formed from a substantially completely non-magnetic material such as brass or bronze. A sealing engagement between the inner wall of the cup 40 and the flange 52 is provided by a pair of O rings 54, conventionally mounted in grooves 56 in the flange 52.

The inner or right hand side of the base of the housing 32 as viewed in Figure 1 is machined smooth and adapted to receive the base of the cup 42. It will be noted that an annular recess 56 is provided in the housing 32 to receive the welded flanges of the cup side wall and base members. The cup base member 42 is positioned between the base of the housing 32 and a bearing cup 58 which contains a sleeve bearing 60 within which is mounted the left hand end of the shaft 22. The cup 58 is provided with a reduced diameter extension or stem 64 extending from the left hand side thereof and into a receiving bore in the base of the housing 32. The stem 64 is provided with an internally threaded bore 66 receiving a bolt 68 having a flanged head bearing against the outer or left hand side of the housing 32 as viewed in Figure 1. It will be evident that the bolt 68 serves to hold the bearing cup 58 firmly against the base of the stator cup 42 and against the base of the housing 32. Two pairs of annularly extending O rings 70 are provided in order to insure a complete seal between the bearing cup 58 and the cup base 42 as well as between the cup base 42 and the base of the housing 32.

A rotor including rotor laminations 72, conductor bars 74 and end collector rings 76 is mounted on the shaft 22 and positioned adjacent to the stator laminations 36. It will be evident that the rotor is a conventional induction motor rotor and may have one or two sets of conductor bars variously formed in accordance with motor practice. The details of the rotor construction are well known in the motor art and need not be described in detail herein. The rotor parts 72, 74 and 76 are contained within a stainless steel enclosure comprising a stainless steel cylindrical member 78 and two stainless steel discs 80 positioned on either side of the rotor. The periphery of the discs and the longitudinal ends of the cylindrical member 78 are welded together as indicated at 82. The discs 80 and the cylindrical member 78 are formed of thin non-magnetic material such as brass or stainless steel depending upon the fluid materials contacting the rotor assembly, however, stainless will be preferably employed due to its higher resistance to abrasion which may occur by virtue of contact of the casing with fluids. The rotor assembly is positioned on the shaft 22 by means of a pair of nuts 84 bearing against opposite sides of the rotor and spaced therefrom by soft washers 86 which are formed of rubber, neoprene or other suitable gasket sealing materials. The shaft 22 is threaded between shoulders 88 and 90 and, thus by adjustment of the two nuts 84 the rotor assembly may be accurately positioned in any desired location between the shoulders on the shaft in order to provide proper alignment of the motor rotor with the motor stator. It will also be evident that the sealing gaskets 86 will serve to seal the openings in the discs 80 through which the shaft 22 passes. Thus, the discs 80 and the cylindrical member 78 effect the seal of the rotor laminations and windings and afford complete protection of these members from corrosive or other destructive effects of liquids surrounding the motor as will be hereinafter described.

As previously noted, the left hand end of the shaft 22 is supported by a bearing 60. A washer 92 is positioned between the bearing 60 and the flange 90. The flange 88 abuts a washer 94 which bears against a flanged bearing member 62 mounted in the thrust plate 26.

The embodiment of the invention shown in Figure 1 is particularly adapted for pumping high temperature fluids in which it is necessary to provide some form of thermal barrier between the fluids being pumped and the motor assembly. Furthermore, the embodiment shown in Figure 1 provides for lubrication of the shaft bearing and cooling of the motor assembly by a flow of fluid through the motor assembly and through a portion of the shaft as will be hereinafter described. It is essential to note that the cooling and lubricating flow is entirely separate from the fluid being pumped in this embodiment of the invention.

The bolt 68 securing the bearing cup 58 in the housing 32 is provided with a longitudinally extending bore 96 which communicates with the bore 66 in the bearing cup 58 and with a longitudinally extending bore 98 in the shaft 22. The bore 98 does not, however, extend completely to the right hand end of the shaft 22 but terminates slightly to the right of the bearing 62 at which location there are provided radially extending bores 100 providing communication between the bore 98 and the exterior of the shaft.

The cup 58 is provided with a longitudinally extending bore 102 displaced from the longitudinal center of the cup and communicating with aligning bores 104 in the base of the stator shielding cup 42 and the base of the stator housing 32. The housing 32 is threaded to receive a conduit 106 for communication with the bore 102.

If a suitable cooling and lubricating fluid is supplied under pressure to the bore 96 within the fitting 68 the fluid will pass into the bore 98 in the shaft 22 and into the space 59 between the left hand end of the shaft 22 and the base of the bearing retaining recess in the cup 58. Fluid thus passing passes between the bearing 60 and the shaft 22 and, if the bearing 60 is provided with oil grooves 61 on its faces adjacent to the shaft 22 and adjacent to the washer 92, the flow of fluid is increased. The bearing 62 similarly receives fluid passing out through radial bores 100 and is provided with oil grooves 63 for the passage of fluid between the bearing 62 and the shaft 22 and between the bearing 62 and the thrust washer 94. The flow of fluid through the bearing 62 will pass around the rotor and between the rotor and the stator, and this flow and the flow passing through the bearing 60 will pass out of the motor through the bore 102 in the bearing cup 58 and out through the conduit 106. Thus, there is provided a flow of cooling and lubricating liquid which may be controlled as to pressure and rate of flow independently of the fluid being pumped. This independence is insured by the provision of a shaft seal assembly which will now be described.

The bore 27 in the thrust plate 26 through which the shaft 22 passes is provided with a radially inwardly extending flange 108. A sealing gasket of rubber, Teflon, neoprene or other similar corrosion and wear resistant material is positioned against the right hand side of the flange 108 as viewed in Figure 1 and is stationary with respect thereto. A stationary seal 114 formed of stainless steel, bronze or other suitable corrosion resistant material bears against the sealing gasket 110 and provides a surface against which a rotary seal 116 will bear. The rotary seal 116 is formed of carbon, ceramic or other suitable material for rotation against the stationary seal 114 and is in fixed sealing engagement with the surface of the shaft 22. The rotary and stationary seals 116 and 114 are held in engagement with each other by means of a spring 120 acting between a cup 118 supporting the rotary seal 116 and a sleeve 122 surrounding the shaft 22 and bearing against the pump impeller hub.

It will be evident that fluid under pressure exists in the chamber 15 to the left of the pump impeller as viewed in Figure 1 and that fluid under pressure exists in the rotor chamber 41 surrounding the shaft 22 at the left hand side of the bearing 62, thus, the seal assembly 108–116 prevents the flow of liquid between the chambers 15 and 41. It will be evident that by adjustment of the pressure of the fluid entering the passage 96 in the bolt 68 the fluid pressure on the left hand side of the seal may be adjusted to be either slightly greater than or slightly less than the pressure of the fluid on the right hand side of the seal, thus, if desired, these two pressures may be adjusted to be substantially equal or to have one or the other of these pressures slightly higher in order to guarantee the prevention of leakage of even minute quantities of fluid in any one direction through the seal.

The thrust plate 26 previously referred to is formed with a central cylindrical portion indicated by the numeral 26 and the two spaced radially extending flanges 124 and 126. An air space 128 exists between these two flanges in free communication with the atmosphere. This air space serves to provide a highly effective thermal barrier between the pump assembly and the motor assembly, thus, when high temperature fluids are pumped by the pump assembly the rate of transfer of heat therefrom to the motor assembly is greatly reduced. Furthermore, the thermal barrier does not provide a forced cooling and thus no chilling is involved which would possibly lead to the undesirable accumulation of deposits on the thrust plate in the chamber 15. The thermal barrier in conjunction with the circulation or coolant and lubricant through the rotor chamber 41 provides a highly effective control of temperature of the motor, thus, in effect, increasing the capacity of the motor and reducing the likelihood of motor insulation failure due to adverse effects of high temperatures. It should be particularly noted that the thermal barrier is provided without there being involved any casing parting, gaskets or other undesirable structural elements.

Figure 2:
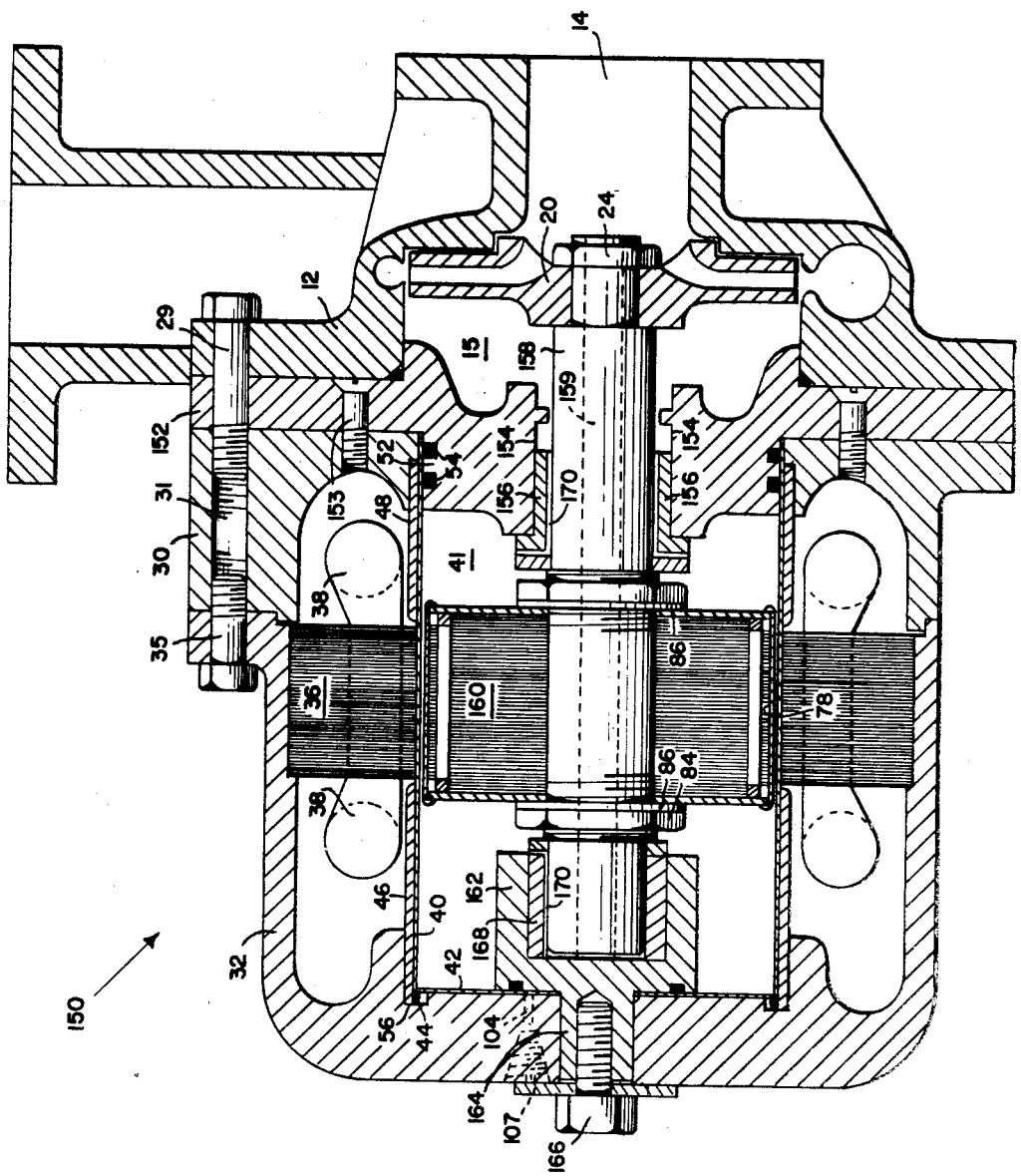
Figure 2 is an axial section through a modified form of the invention.

An alternative embodiment of the invention is shown in Figure 2. This embodiment of the invention is particularly adapted for applications in which the fluid pumped by the pump impeller may also be employed as a lubricant for the shaft bearings and a coolant for the motor assembly. Thus, in this embodiment of the invention the pump impeller is employed as a pumping means for providing circulation of fluid being pumped through the shaft bearings and the motor assembly.

The arrangement, as indicated generally at 150 in Figure 2, includes an impeller housing 12, an impeller 20, a motor stator housing 32 and annular member 30 substantially identical to those described in connection with Figure 1. Contained within the motor housing are stator laminations 36 and stator windings 38 identical to those described in connection with Figure 1, and an internal cup having a side wall 40 and a base 42 and providing a rotor chamber 41 identical to that described in connection with Figure 1. In this form of the invention, however, the thrust plate is in the form of a single radially extending disc 152 attached directly to the annular member 30 by means of flush head screws 153, and the bores 31 in the annular member 30 are threaded to receive bolts 29 and 35 for attachment of the impeller housing 12 and the stator housing 32, respectively. This arrangement provides for independent disassembly of the impeller housing 12 and the motor housing 32 from the thrust plate and annular member assembly. The thrust plate 152 is provided with an enlarged central portion having a longitudinally extending bore 154 mounting a bearing 156 supporting a shaft 158 on which the impeller 20 is mounted and on which a rotor assembly 160 is mounted. The rotor assembly and the method of mounting thereof is identical to that described in connection with Figure 1. The left hand end of the shaft 158 is mounted in a bearing cup 162 having a stem 164 extending through the base 42 of the cup and into the base of the motor housing 32. The bearing cup 162 is drawn against the base 42 of the cup and against the base of the housing 32 by means of a bolt 166.

In this form of the invention the bolt 166 and the bearing cup 162 are not provided with longitudinally extending bores and the bore 104 in the motor housing is sealed by a plug 107. Alternatively, the bore 104 may be omitted from the housing. It will also be evident that the bearing cup 58 used in Figure 1 could be used in Figure 2 with the bore 96 and the bolt 68 being plugged.

In this form of the invention, however, the shaft 158 is provided with a longitudinally extending bore extending from end to end of the shaft and the bearings 156 and 168 positioned in the thrust plate and shaft cup, respectively, are provided with oil grooves 170.

In this form of the invention operation of the motor and pump impeller will cause an increase in pressure of fluid being pumped between the pump inlet passage 14 and the chamber 15 to the left of the impeller 20. Thus, fluid at a higher pressure from the chamber 15 may flow to the left as viewed in Figure 2 through the lubricant grooves 170 in the bearing 156, through the rotor chamber 41, through the lubricant grooves 170 and the bearing 168, and around the left end of the shaft 158 to the central bore 159 in the shaft 158 and back to the pump inlet chamber 14. In view of the fact that the same fluid being pumped is employed to provide coolant for the motor and lubrication for the pump shaft bearings it is unnecessary to provide a thrust plate having the thermal barrier provision described in connection with Figure 1.

Figure 3:
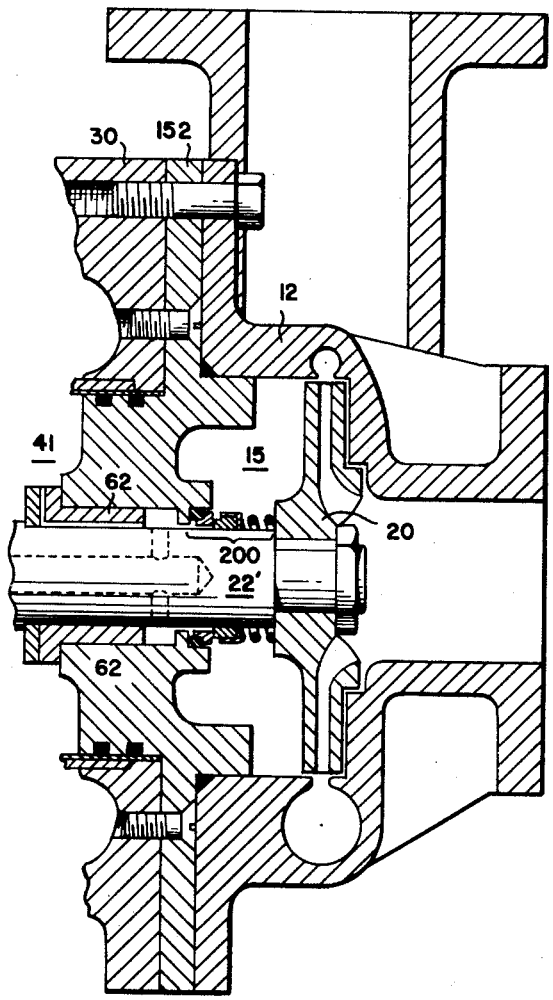
Figure 3 is a fragmentary axial section showing a modification of the form of the invention shown in Figure 2.

In some applications there is required a pump for pumping abrasive laden fluids in which the thermal barrier is not required but in which a separate lubricant and coolant fluid is necessary. A combination pump and motor of this type is shown in Figure 3 in which there is employed a pump housing 12 and pump impeller 20 identical to those heretofore described. The thrust plate 152 is identical to that described in connection with Figure 2. The motor assembly is identical to that described including the anular member 30. In this form of the invention, however, the pump shaft 22' is identical to that described in connection with Figure 1 except that the shaft is slightly shorter to make up for the difference in thickness of the thrust plate assembly employed and a shaft bearing cup such as that described in connection with Figure 1 is employed providing passages 104, 102 and 68 for circulation of fluid.

The shaft 22' is supported between bearings, one of which is shown at 62, identical to the manner of the support of the shaft 22 described in connection with Figure 1 and the rotating shaft seal arrangement indicated within the bracket 200 is identical to that including the parts 110–120 described in connection with Figure 1. In Figure 3, however, the sleeve 122 is omitted due to the shortening of the longitudinal length of the shaft in the region of the thrust plate 52. Thus, in the arrangement shown in Figure 3 there is provided a separate flow of coolant and lubricant liquid and this liquid within the rotor chamber 41 is completely sealed from the fluid being pumped existing in the chamber 15 to the left of the pump impeller 20.

Figure 4:
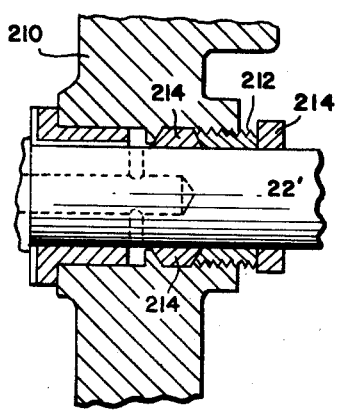
Figure 4 is still another fragmentary axial section showing another modification of the form of the invention shown in Figure 2.

In the arrangement shown in Figure 3 where heat is not a factor, if desired, a more simple and conventional type of packing gland may be employed to prevent leakage of fluid between the impeller chamber 15 and the rotor chamber 41. Such an arrangement is shown in Figure 4 in which a thrust plate 210 is provided which is substantially similar to the thrust plate 152 with the exception of the fact that the bore within the plate through which the shaft 22' passes is threaded as indicated at 212 and a suitable packing material located at 214 is positioned therein by means of a conventional threaded sleeve 214.

In each of the above described pump assemblies, the thrust plate supports a bearing which is both journal and thrust bearing resisting longitudinal motion of the pump impeller which results from the pressure differences existing during operation of the pump. The left hand end of the shaft is supported in a bearing cup which can be accurately located by means of the stem thereon extending into the bore in the stator housing and which avoids the necessity of any provision of packing or other similar sealing means between a rotating shaft and the exterior of the combination pump and motor assembly. These and the various other structural details which have been described provide for the advantage hereinabove enumerated and it will be evident that various details described in connection with the various embodiments of the invention may be combined in various combinations without departing from the scope of the invention as set forth in the following claims.

What I claim is:

1. A combination pump and motor assembly comprising pump housing means, motor housing means, means joining said two housing means, said motor housing means being in the form of a cup having its upper end facing toward said joining means, a motor stator mounted in said motor housing means, a shaft extending into both of said housing means, a pump impeller mounted on said shaft in said pump housing means, a motor rotor mounted on said shaft in said motor housing means in alignment with said motor stator, means for circulating fluid over said rotor, means in the form of a cup having its open end facing toward said joining means sealing said motor stator from said fluid, and means rotatably mounting said shaft, said last mentioned means including bearing means in the form of a cup mounted inside of the base of said motor housing means and inside the base of said stator sealing cup, and means acting against the outside of said motor housing means and holding said bearing cup in position and the base of said sealing cup against the base of said motor housing means.

2. A combination pump and motor assembly comprising pump housing means motor housing means, means joining said two housing means, a motor stator mounted in said motor housing means, a shaft extending through a bore in said joining means and into each of said housings, said bore being substantially larger in diameter than said shaft, means for revolubly mounting said shaft including a bearing sealingly fitted into the end of said bore on the motor side of said joining means, sealing means within said bore disposed in axially spaced fixed relation to said bearing thereby to provide an annular space about said shaft between said bearing and sealing means including an element fixedly sealingly engaging the wall of said bore, a second element slidably sealingly embracing said shaft for rotation, and spring means carried by said shaft and acting to press said elements into sealing engagement with one another, said shaft being provided with a passage communicating with the annular space aforesaid, and said bearing being provided with a passage placing said annular space in communication with the interior of sid motor housing.

3. A pump and motor assembly as defined in claim 2 wherein the means for joining the pump and motor housings is provided with an integral annular flange extending radially inwardly from the wall of the shaft accommodating bore, the first mentioned sealing element abuts said flange, and the spring means is in the form of a coil spring wrapped about the shaft and acting to urge the second mentioned sealing element axially toward the first mentioned sealing element.

References Cited in the file of this patent

UNITED STATES PATENTS

| | | |
|---|---|---|
| 1,114,727 | Breeze | Oct. 27, 1914 |
| 1,426,943 | Alexanderson | Aug. 22, 1922 |
| 2,291,346 | Robinson | July 28, 1942 |
| 2,301,063 | McConaghy | Nov. 3, 1942 |
| 2,369,440 | Curtis | Feb. 13, 1945 |
| 2,434,979 | Bergh | Jan. 27, 1948 |
| 2,492,141 | Gaylord | Dec. 27, 1949 |
| 2,517,233 | Peters | Aug. 1, 1950 |
| 2,556,435 | Moehrl et al. | June 12, 1951 |
| 2,649,048 | Pezzillo et al. | Aug. 18, 1953 |
| 2,669,187 | Guyer | Feb. 16, 1954 |
| 2,677,065 | Van der Heem | Apr. 27, 1954 |
| 2,799,227 | Allen | July 16, 1957 |
| 2,845,871 | Compton | Aug. 5, 1958 |

FOREIGN PATENTS

| | | |
|---|---|---|
| 200,935 | Australia | Nov. 10, 1955 |
| 666,439 | Great Britain | Feb. 13, 1952 |
| 1,111,911 | France | Nov. 2, 1955 |